(12) United States Patent
Yoshino et al.

(10) Patent No.: US 11,845,841 B2
(45) Date of Patent: Dec. 19, 2023

(54) POLYESTER FILM FOR SURFACE PROTECTION FILM OF FOLDABLE DISPLAY AND USE THEREOF

(71) Applicant: TOYOBO CO., LTD., Osaka (JP)

(72) Inventors: Kenji Yoshino, Tsuruga (JP); Kiwamu Kawai, Tsuruga (JP); Shotaro Nishio, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 63 days.

(21) Appl. No.: 17/048,376

(22) PCT Filed: Apr. 3, 2019

(86) PCT No.: PCT/JP2019/014813
§ 371 (c)(1),
(2) Date: Oct. 16, 2020

(87) PCT Pub. No.: WO2019/202992
PCT Pub. Date: Oct. 24, 2019

(65) Prior Publication Data
US 2021/0179794 A1 Jun. 17, 2021

(30) Foreign Application Priority Data
Apr. 19, 2018 (JP) ................. 2018-080327

(51) Int. Cl.
*C08J 7/043* (2020.01)
*C08J 7/046* (2020.01)
(Continued)

(52) U.S. Cl.
CPC ................ *C08J 7/043* (2020.01); *C08J 5/18* (2013.01); *C08J 7/046* (2020.01); *G02B 1/14* (2015.01);
(Continued)

(58) Field of Classification Search
CPC ... B32B 7/12; B32B 17/064; B32B 2307/536; B32B 2457/20; B32B 2250/02;
(Continued)

(56) References Cited

U.S. PATENT DOCUMENTS 9,422,187 B1 8/2016 Bankaitis et al.
2006/0121299 A1 * 6/2006 Hashimoto .............. C09D 5/32
428/522
(Continued)

FOREIGN PATENT DOCUMENTS

CN 107407764 A * 11/2017 ............. B32B 27/18
CN 107849390 A * 3/2018 ............. B32B 27/30
(Continued)

OTHER PUBLICATIONS

Japansese Patent Office, International Search Report in International Patent Application No. PCT/JP2019/014813 (dated Jul. 9, 2019).
(Continued)

*Primary Examiner* — Tamra L. Dicus
(74) *Attorney, Agent, or Firm* — Leydig, Voit & Mayer, Ltd.

(57) ABSTRACT

Provided are a foldable display that is excellent in mass production applicability, and that does not have image distortion that can appear in the folding portion after the display is repeatedly folded; and a mobile device equipped with such a foldable display. Provided are a polyester film for surface protection films and a hard coating film for surface protection films for the foldable display and mobile device. The polyester film is for foldable display surface protection films, wherein the polyester film is cut in sheet form, the polyester film has a thickness of 10 to 75 μm, the polyester film has an intrinsic viscosity of 0.55 to 0.65 dl/g, and the amount of rise of a cut plane on at least one side of one or more cut end portions is 35 μm or less. The hard
(Continued)

coating film, the foldable display, and the mobile device use the polyester film for foldable display surface protection films.

7 Claims, 2 Drawing Sheets

(51) Int. Cl.
  *G02B 1/14* (2015.01)
  *C08J 5/18* (2006.01)
  *G06F 1/16* (2006.01)
  *G09F 9/30* (2006.01)
(52) U.S. Cl.
  CPC ............ *G06F 1/1652* (2013.01); *G09F 9/301* (2013.01); *C08J 2367/00* (2013.01)
(58) Field of Classification Search
  CPC ........ B32B 2307/732; B32B 2307/412; B32B 2307/558
  See application file for complete search history.

(56) References Cited

U.S. PATENT DOCUMENTS

| | | | | |
|---|---|---|---|---|
| 2006/0227439 | A1* | 10/2006 | Taki | ................ C08J 7/0427 359/883 |
| 2011/0209901 | A1* | 9/2011 | MacDonald | ........... C08J 7/0427 427/508 |
| 2013/0264730 | A1* | 10/2013 | Wu | .................... B32B 38/0004 428/192 |
| 2014/0217397 | A1* | 8/2014 | Kwak | ................ H01L 27/124 257/43 |
| 2016/0297958 | A1 | 10/2016 | Kitayama et al. | |
| 2017/0276840 | A1 | 9/2017 | Horio et al. | |
| 2018/0081088 | A1* | 3/2018 | Hwang | ................ C03C 17/007 |
| 2018/0165996 | A1 | 6/2018 | Ochi et al. | |
| 2018/0217639 | A1* | 8/2018 | Jones | .................... G06F 1/1626 |
| 2018/0329125 | A1 | 11/2018 | Hikita et al. | |
| 2020/0398530 | A1* | 12/2020 | Kuo | ................. B32B 17/10165 |

FOREIGN PATENT DOCUMENTS

| | | |
|---|---|---|
| EP | 2783786 A1 | 10/2014 |
| JP | 2002-011697 A | 1/2002 |
| JP | 2004-142372 A | 5/2004 |
| JP | 2007-314717 A | 12/2007 |
| JP | 2010-228391 A | 10/2010 |
| JP | 2016-155124 A | 9/2016 |
| JP | 2017-033624 A | 2/2017 |
| JP | 2017-102443 A | 6/2017 |
| KR | 10-2008-0066651 A | 7/2008 |
| KR | 20170016297 A * | 2/2017 |
| KR | 10-2017-0082213 A | 7/2017 |
| WO | WO 2015/075941 A1 | 5/2015 |
| WO | WO 2016/204121 A1 | 12/2016 |

OTHER PUBLICATIONS

Korean Intellectual Porperty Office, Notice of Final Rejection in Korean Patent Application No. 10-2020-7033018 (dated Dec. 28, 2022).

* cited by examiner

POLYESTER FILM FOR SURFACE PROTECTION FILM OF FOLDABLE DISPLAY AND USE THEREOF

CROSS-REFERENCE TO RELATED APPLICATIONS

This patent application is the U.S. national phase of International Patent Application No. PCT/JP2019/014813, filed on Apr. 3, 2019, which claims the benefit of Japanese Patent Application No. 2018-080327, filed on Apr. 19, 2018, which are incorporated by reference in their entireties herein.

TECHNICAL FIELD

The present invention relates to polyester films for foldable display surface protection films, hard coating films for foldable display surface protection films, foldable displays, and mobile devices. The present invention further relates to foldable displays and mobile devices that are resistant to image distortion caused by deformation of the film positioned on the surface, even when the display is repeatedly folded; and polyester films and hard coating films for surface protection films of such foldable displays.

BACKGROUND ART

Becoming thinner and lighter, mobile devices such as smart phones have become widely prevalent. While being required to have a variety of functions, mobile devices are also required to be convenient in use. It is taken for granted that prevailing mobile devices can be operated with one hand for simple tasks, and can be put into a clothes pocket. Thus, such mobile devices must have a small screen size, such as about 6 inches.

Tablet devices with a screen size of 7 to 10 inches are intended for use not only for video content and music, but also for business purposes, drawing, and reading; and thus have a high level of functionality. However, these devices cannot be operated with one hand and are not particularly portable, leaving some issues in regards to convenience.

In order to meet the requirements above, PTL 1 suggests a technique of making compact devices by connecting multiple displays. However, due to the remaining bezel portion, the image is cut up, and the visibility becomes low. Thus, this technique is not commonly used.

More recently, mobile devices equipped with a flexible or foldable display have been proposed. This technique enables one to conveniently carry a mobile device equipped with a large screen display without image-cutting problems.

Conventional displays and mobile devices that have no folding structure can be protected by a non-flexible material, such as glass, applied to the surface of the display. However, a foldable display that uses a single screen that spans over a folding portion must be protected by a flexible and surface-protectable hard coating film. However, a foldable display is repeatedly folded at the point that is a folding portion; and the film at the point deforms over time, causing image distortion on the display.

PTL 2 suggests a method of partially altering film thicknesses. However, this method is not suitable for mass production.

Hard coating films capable of protecting the surface as described above are required to be resistant to cracks or severe crease formation due to repeated folding. When a film of a constant thickness is bent, compressive stress is applied to the inner side of the bent film, while tensile stress is applied to the outer side of the bent film. When being bent in the same bend radius, a thicker film results in a greater amount of deformation in both the inner and outer sides due to folding, which increases both the compressive stress and tensile stress. This can be disadvantageous in repeated flex resistance.

Regarding the effect of this film thickness on flex resistance, the same is true not only for the average thickness of the film, but also for local points (e.g., the end portion of the cut plane of the film). In other words, if the thickness of the cut section locally increases and becomes thick, cracks and deformation are more likely to occur due to repeated folding, which can distort the image on the display.

CITATION LIST

Patent Literature

PTL 1: JP2010-22?391A
PTL 2: JP2016-155124A

SUMMARY OF INVENTION

Technical Problem

The present invention is intended to solve the problems that arise in conventional surface protection members of displays as described above. The invention is intended to provide a polyester film for foldable display surface protection films and a hard coating film for foldable display surface protection films, in order to provide a foldable display that is suitable for mass production and that is unlikely to have distortion of images on the folding portion after the display is repeatedly folded; and a mobile device equipped with such a foldable display.

Solution to Problem

Specifically, the present invention includes the following subject matter.

Item 1.

A polyester film for a foldable display surface protection film,
wherein
  the polyester film is cut in sheet form,
  the polyester film has a thickness of 10 to 75 μm,
  the polyester film has an intrinsic viscosity of 0.55 to 0.65 dl/g, and
  the amount of rise of a cut plane on at least one side of one or more cut end portions is 35 μm or less.

Item 2.

The polyester film for the foldable display surface protection film according to Item 1, wherein the amount of rise of the cut plane of each of two cut end portions facing each other is 35 μm or less, the cut plane being formed by cutting the polyester film in the bending direction of the polyester film, the bending direction being a direction orthogonal to a folding portion of the polyester film when the polyester film is folded.

Item 3.

The polyester film for the foldable display surface protection film according to Item 1 or 2, wherein one or more cut end portions are formed by using a laser beam.

Item 4.

A hard coating film for a foldable display surface protection film, comprising the polyester film for the foldable display surface protection film of any one of Items 1 to 3, and
a hard coating layer with a thickness of 1 to 50 μm formed on at least one surface of the polyester film.

Item 5.

The hard coating film for the foldable display surface protection film according to Item 4, wherein the hard coating layer has a pencil hardness of H or more as measured under a load of 750 g in accordance with JIS K5600-5-4:1999.

Item 6.

A foldable display having the hard coating film for the foldable display surface protection film of Item 4 or 5, wherein
the hard coating film is disposed as a surface protection film such that the hard coating layer becomes the surface, and
the foldable display has a bend radius of 5 mm or less when the foldable display is folded.

Item 7.

The foldable display according to Item 6, wherein the hard coating film is a single continuous film placed through the folding portion of the foldable display.

Item 8.

A mobile device comprising the foldable display of Item 6 or 7.

Advantageous Effects of Invention

While maintaining its suitability in mass production, a foldable display using a polyester film or hard coating film for foldable display surface protection films according to the present invention is resistant to image distortion at the folding portion of the display, because the polyester film or hard coating film does not deform after being repeatedly folded. A mobile device equipped with such a foldable display provides beautiful images and has a variety of functions, while being excellent in convenience such as portability.

DESCRIPTION OF EMBODIMENTS

Display

Figure 1:
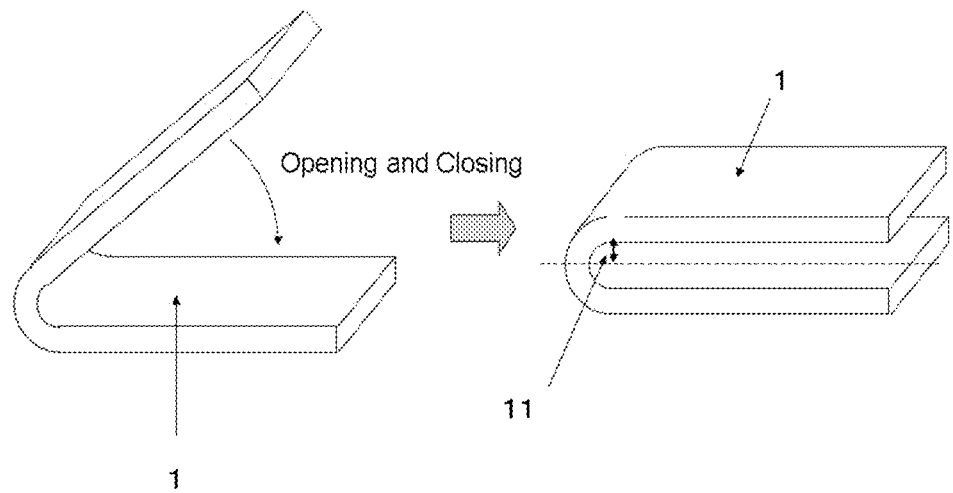
FIG. 1 is a schematic diagram showing a point at which the bend radius of the foldable display according to the present invention is measured.

The term "display" as used in the present invention refers to display devices in general. There are several types of displays such as LCDs, organic EL displays, inorganic EL displays, LEDs, and FEDs; however, LCDs, organic ELs, and inorganic ELs, which have a foldable structure, are preferable. In particular, organic EL displays and inorganic EL displays, which can reduce the layer structure, are preferable; and organic EL displays, which have a wide color gamut, are even more preferable.

Foldable Display

A foldable display preferably has enhanced portability with the structure such that a single continuous piece of display is folded in half when carried, thus reducing the size thereof. At the same time, the foldable display is preferably thin and lightweight. Thus, the foldable display preferably has a bend radius of 5 mm or less, and more preferably 3 mm or less. A bend radius of 5 mm or less enables the foldable display to be thin when being folded. A smaller bend radius is better; however, the bend radius can be 0.1 mm or more, or even 0.5 mm or more. Even a bend radius of 1 mm or more ensures sufficient practical use compared with conventional displays with no such foldable structure. The bend radius of a folded device being folded is measured at the point marked with reference numeral 11 in the schematic diagram of FIG. 1, and refers to the inner radius of the folding portion of the device being folded. A surface protection film, described later, may be located on the outer side or the inner side of the folded foldable display. In other words, a mobile device with a foldable display may have the foldable display positioned on the outer side or inner side of the device being folded.

Organic EL

A typical structure of organic EL displays includes an organic EL layer composed of an electrode, an electron transport layer, a light-emitting layer, a hole transport layer, and a transparent electrode; a retardation film for improving image quality; and a polarizer.

Mobile Device with a Touchscreen

When an organic EL display is used in a mobile device equipped with a touchscreen, a touchscreen module is placed on top of the organic EL display, or between the organic EL layer and the retardation film. Because a shock applied from above may break the circuit of the organic EL display and the touchscreen, a surface protection film is necessary. The film disposed on the front surface of the display as a surface protection film preferably includes a hard coating layer that comes at least on the side of the surface of the display.

Foldable Display Surface Protection Film

Surface protection films for use can be those that have high light transmittance with low haze, such as polyimide films, polyester films, polycarbonate films, acrylic films, triacetyl cellulose films, and cycloolefin polymer films. Of these, polyimide films and polyester films, which have high shock resistance and sufficient pencil hardness, are preferable; and polyester films, which can be manufactured at low cost, are particularly preferable.

In the present invention, a polyester film may be a monolayered film composed of one or more types of polyester resins. If two or more types of polyester are used, the polyester film may be a multilayered film or ultra-multilayered lamination film with a repeating structure.

Examples of polyester resins includes polyethylene terephthalate, polybutylene terephthalate, polyethylene-2,6-naphthalate, and polyester films composed of copolymers that contain the component of these resins as the main component. In particular, from the standpoint of mechanical properties, heat resistance, transparency, and price, drawn polyethylene terephtalate films are particularly preferable.

When a polyester copolymer is used in a polyester film, the dicarboxylic acid component of the polyester can be, for example, aliphatic dicarboxylic acids, such as adipic acid and sebacic acid; aromatic dicarboxylic acids, such as terephthalic acid, isophthalic acid, phthalic acid, and 2,6-naphthalene dicarboxylic acid; or multifunctional carboxylic acids, such as trimellitic acid, and pyromellitic acid. The glycol component can be, for example, fatty acid glycols, such as ethylene glycol, diethylene glycol, 1,4-butanediol, propylene glycol, and neopentyl glycol; aromatic glycols, such as p-xylene glycol; alicyclic glycols, such as 1,4-cyclohexanedimethanol; or polyethylene glycols with an average molecular weight of 150 to 20,000. The mass ratio of copolymer component of the copolymer is preferably less than 20 mass %. A mass ratio of less than 20 masse is preferable because film strength, transparency, and heat resistance are retained.

In the production of a polyester film, at least one type of resin pellet preferably has an intrinsic viscosity of 0.55 to 0.75 dl/g. An intrinsic viscosity of 0.55 dl/g or more is preferable because such an intrinsic viscosity increases the shock resistance of the obtained film, and thus makes it unlikely for the internal circuit to be broken by an external shock. An intrinsic viscosity of 0.55 dl/g or more is also preferable because it contributes to smaller deformation of the foldable display when the display is repeatedly bent. An intrinsic viscosity of 0.75 dl/g or less is preferable because it prevents filtration pressure of the molten fluid from becoming overly too high, thus making it easier to stably operate film production.

Regardless of whether the film is a monolayer or a laminate, the film preferably has an intrinsic viscosity of 0.55 dl/g or more, and still more preferably 0.58 dl/g or more. An intrinsic viscosity of 0.55 dl/g or more provides fatigue resistance and sufficient flex resistance. An intrinsic viscosity of 0.65 dl/g or less is preferable because it enables excellent operability in production. An intrinsic viscosity of 0.65 dl/g or less is also preferable because it can reduce the amount of rise of the cut plane when the film is molten and cut by a laser beam.

The polyester film preferably has a thickness of 10 to 75 μm, and more preferably 25 to 75 μm. A thickness of 10 μm or more provides a pencil hardness improvement effect; and a thickness of 75 μm or less is advantageous in weight reduction, and provides excellent flexibility, processability, and handleability.

The surface of the polyester film according to the present invention may be smooth, or somewhat uneven. However, decreased optical properties due to unevenness is not preferable, because the film is used for covering the surface of a display. The haze is preferably 3 or less, more preferably 2 or less, and most preferably 1% or less. A haze of 3% or less can improve the visibility of images. Although a lower haze is better, the lower limit of haze may be 0.1% or more, or 0.3% or more.

Given the purposes of reducing haze as described above, the surface should not be overly uneven. However, to provide the film with moderate slipperiness for handleability, unevenness may be formed on the film surface by adding filler to the polyester resin layer of the surface layer, or by applying a filler-containing coating layer to the polyester resin layer during the film-forming process.

The method for adding particles to a base film can be a known method. For example, particles can be added at any stage of polyester production; and can be preferably added in the form of slurry prepared by dispersing the particles in, for example, ethylene glycol in the esterification stage, after the completion of transesterification, or before the start of polycondensation to facilitate polycondensation. Alternatively, particles can be added by a method of blending slurry prepared by dispersing particles in ethylene glycol or water with a polyester material by using a kneading extruder equipped with a vent, or a method of blending dry particles with a polyester material by using a kneading extruder.

In particular, preferable is a method of homogeneously dispersing the aggregates of inorganic particles in a monomer solution, which is part of a polyester material; then filtering the dispersion; and adding the filtrate to the remainder of the polyester material before, during, or after esterification. This method, due to the low viscosity of the monomer solution, enables homogeneous dispersion of particles and high-precision filtration of the slurry in a simple manner, while ensuring excellent particle dispersibility and low likeliness of the occurrence of new aggregates when particles are added to the remainder of the polyester material. From this viewpoint, it is particularly preferable to add particles to the remainder of the polyester material at a low temperature before esterification.

Additionally, the number of protrusions on the surface of the film can be further reduced by a method of preparing a particle-containing polyester beforehand, and kneading and extruding pellets of the particle-containing polyester with particle-free pellets (master batch method).

The polyester film may contain various additives within the range in which a desirable total light transmission is maintained. Examples of additives include an antistatic agent, a UV absorber, and a stabilizer.

The polyester film has a total light transmittance of preferably 65; or more, and more preferably 67; or more. A transmittance of 65% or more sufficiently ensures visibility. Although a higher total light transmittance of the polyester film is better, the total light transmittance can be 99% or less, or 97% or less.

The surface of the polyester film according to the present invention can be subjected to treatment for improving adhesion with a resin for forming, for example, a hard coating layer.

Examples of surface treatment methods include unevenness forming treatment by sandblasting, solvent treatment, etc.; and oxidation treatment such as corona discharge, electron beam irradiation, plasma treatment, ozone/UV irradiation, flame treatment, chromic acid treatment, and hot air treatment. These methods can be used without any restriction.

Adhesion can also be improved by an adhesion-improving layer, such as an easy-to-adhere layer. An easy-to-adhere layer can be formed on the surface of the polyester film by a method of applying a coating solution to at least one surface of the polyester film at any stage of the production process of the polyester film. For example, a uniaxially-oriented PET film is first prepared, and then an easy-to-adhere layer can be formed on one surface of the polyester film. The solids concentration of the resin composition in the coating solution is preferably 2 to 35 mass %, and particularly preferably 4 to 15 mass %.

The easy-to-adhere layer for use without any restriction includes acrylic resins, polyester resins, polyurethane resins, and polyether resins. To improve the adhesion durability of these easy-to-adhere layers, these layers may have a cross-linked structure. Specific crosslinking agents include urea-based crosslinking agents, epoxy-based crosslinking agents, melamine-based crosslinking agents, isocyanate-based crosslinking agents, oxazoline-based crosslinking agents, and carbodiimide-based crosslinking agents. To impart slipperiness to the surface of the easy-to-adhere layers, these layers may also contain lubricant particles. The particles may be inorganic particles or organic particles, and include, although not limited to, inorganic particles, such as silica, kaolinite, talc, calcium carbonate, zeolite, alumina, barium sulfate, zirconium oxide, and titanium dioxide; and organic particles, such as acrylic or methacrylic particles, vinyl chloride particles, vinyl acetate particles, melamine particles, polycarbonate particles, urea particles, epoxy particles, urethane particles, phenolic particles, diallyl phthalate particles, and polyester particles. To impart moderate slipperiness to the coating layer, silica is particularly preferable for use.

An easy-to-adhere layer can be formed on the surface of the polyester film by a method of applying a coating solution to at least one surface of the polyester film at any stage of the production process of the polyester film. For example, a uniaxially-oriented PET film is first prepared, and then an easy-to-adhere layer can be formed by a known coating method. Examples of coating methods include reverse roll coating, gravure coating, kiss coating, reverse kiss coating, die coater, roll brush coating, spray coating, air knife coating, wire bar coating, a pipe doctor method, impregnation coating, and curtain coating. In the present invention, the ultimately obtained easy-to-adhere layer preferably has a thickness of 0.03 to 0.20 g/m. A thickness of less than 0.03 g/m$^2$ results in lowered adhesion, and a thickness of more than 0.20 g/m$^2$ results in decreased blocking properties and slipperiness; thus, such thickness is not preferable.

The polyester film described above can be produced, for example, by performing a polymerization step of homogenously dispersing inorganic particles in a monomer solution, which is part of a polyester material, filtering the dispersion, and adding the filtrate to the remainder of the polyester material to polymerize a polyester; and a film-forming step of melting and extruding the polyester into a sheet form through a filter, and cooling and drawing the sheet to form a base film. To achieve strength, dimensional stability, and heat resistance of the film, the film is preferably biaxially drawn to prepare a biaxially-oriented polyester film.

Below, the method for producing a biaxially-oriented polyester film is described with an example in which pellets of polyethylene terephthalate ("PET" below) are used as a material of a base film. However, the method is not limited to this example. Additionally, the example is not intended to limit the number of layers such as a monolayer or a multilayer.

After a predetermined proportion of PET pellets are mixed and dried, the mixture is fed to a known extruder for melting and laminating; and then extruded from the slit die into a sheet form, followed by cooling and solidifying the sheet on a casting roll to form an unstretched film. A monolayer can be produced with a single extruder. A multilayered (i.e., including two or more layers) film can be produced by laminating multiple film layers that each constitute an outermost layer using two or more extruders, a multilayered manifold, or a confluence block (e.g., confluence blocks with a square joint); extruding a sheet of two or more layers from the outlet; and cooling the sheet on a casting roll to prepare an unstretched film.

In this case, it is preferable to perform high-precision filtration to remove foreign matter that may be present in the resin at any portion of the extruder at which the molten resin is maintained at about 280° C. during melt-extrusion. The filter material for use in high-precision filtration of a molten resin can be any material; however, a filter material made of sintered stainless steel is preferable because it is excellent in removing aggregate composed mainly of Si, Ti, Sb, Ge, or Cu and organic matter with a high melting point.

Additionally, the filter material has a filtered particle size (initial filtration efficiency: 95%) of preferably 20 μm or less, particularly preferably 15 μm or less. A filtered particle size (initial filtration efficiency: 95%) exceeding 20 μm may lead to insufficient removal of foreign matter with a size of 20 μm or more. Although high-precision filtration of molten resin using a filter with a filtered particle size of 20 μm or less (initial filtration efficiency: 95%) may reduce productivity, such a filter is preferable from the standpoint of obtaining a film that has fewer protrusions caused by coarse particles.

Figure 2:
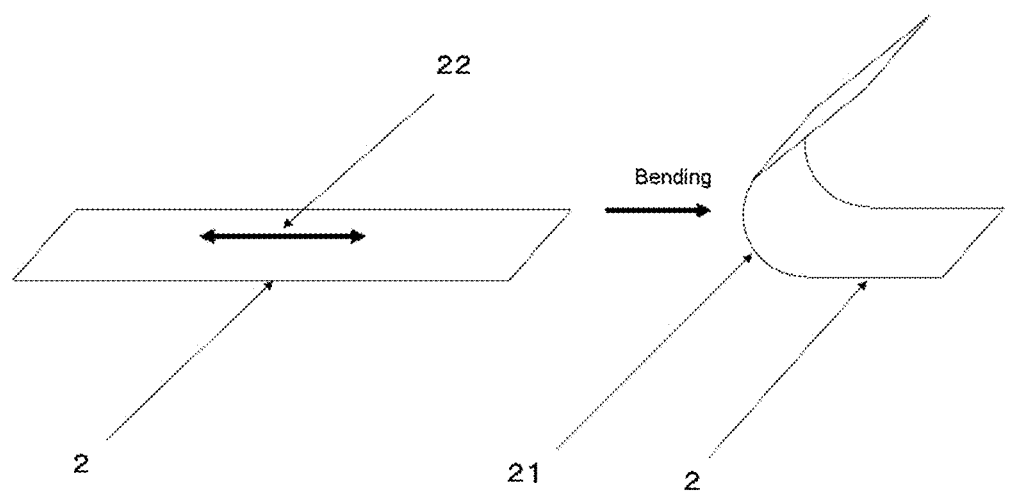
FIG. 2 is a schematic diagram showing the bending direction of the polyester film for foldable display surface protection films according to the present invention.

The draw ratio in the direction orthogonal to the bending direction when the film is folded (the direction of the folding portion) is preferably greater than the draw ratio in the bending direction from the standpoint of mechanical properties of the film. Examples of the draw ratio in the direction orthogonal to the bending direction include 2.5- to 5.0-fold. A draw ratio within this range is preferable because a draw ratio of 2.5-fold or more achieves stable productivity, while a draw ratio of 5.0 or less provides excellent flex resistance. The term "bending direction" as used here refers to a direction that is orthogonal to the folding portion (reference numeral 21) assumed in the use of a foldable display surface protection film, as indicated by reference numeral 22 on a polyester film (reference numeral 2) illustrated in FIG. 2. The bending direction is not limited to either the longitudinal direction or the width direction of the film.

In the present invention, the draw ratio of an unstretched polyester sheet either in the longitudinal direction (machine direction) or in the width direction is preferably 1.0- to 3.4-fold, and more preferably 1.4- to 2.0-fold, from the standpoint of flex resistance. The draw direction is preferably the bending direction. A draw ratio of 1.4-fold or more is preferable due to no deformation during hard coating application, while a draw ratio of 2.0-fold or less is preferable because excellent flex resistance can be achieved. A draw ratio of 3.0- to 3.4-fold is more preferable from the standpoint of stable productivity. The draw temperature is preferably 75 to 120° C., and more preferably 75 to 105° C. The heating method for use during drawing can be a known technique, such as a hot air heating method, a roll heating method, or an infrared heating method. A draw temperature of 75 to 120° C. can prevent the film from having great unevenness in the thickness caused by drawing at a draw ratio within the range described above.

Specifically, for example, after the pellets of PET are sufficiently dried in vacuum, the pellets are fed into an extruder; and then melted and extruded in a sheet form at about 280° C., followed by cooling and solidifying the sheet to form an unstretched PET sheet. The obtained unstretched sheet is stretched 1.0- to 3.4-fold with rolls heated to 80 to 130° C. to obtain a uniaxially oriented PET film. The film is then held with clips at the ends thereof, and guided to a hot air zone heated to 80 to 180° C.; and dried, followed by drawing 2.5- to 5.0-fold in the width direction. Subsequently, the film is guided to a heat treatment zone at 180 to 250° C.; and treated with heat for 1 to 60 seconds, thereby completing crystalline orientation. During this heat treatment step, the film may optionally be subjected to relaxation treatment by 1 to 12% in the width or longitudinal direction.

Hard Coating Layer

The polyester film for protecting a foldable display by positioning on the surface of the display preferably has a hard coating layer on the surface of the film. The hard coating layer is preferably used in a display by positioning on the surface of the polyester film on the surface of the display. The resin for forming a hard coating layer can be any resin through which visible light transmits, but is preferably a resin with high light transmittance. Examples of materials for use include acrylic resins, polycarbonate resins, vinyl chloride resins, polyester resins, urethane resins, epoxy resins, melamine resins, siloxane resins, organic and inorganic hybrid resins, and resins that are cured by active energy beams.

Examples of resins that are cured by active energy beams such as ultraviolet rays and electron beams include compounds having a (meth)acrylate functional group, such as polyester (meth)acrylate, urethane (meth)acrylate, epoxy (meth)acrylate, and silicone (meth)acrylate; and compounds having an unsaturated double bond, such as an allyl group and a vinyl group. Additionally, a polyfunctional monomer may also be used in combination to increase the hardness of the hard coating layer. Examples of polyfunctional monomers include trimethylolpropane tri(meth)acrylate, hexanediol (meth)acrylate, tripropylene glycol di(meth)acrylate, diethylene glycol di(meth)acrylate, pentaerythritol tri meth)acrylate, dipentaerythritol hexa(meth) acrylate, 1,6-hexanediol di(meth)acrylate, and neopentyl glycol di(meth)acrylate. These materials may be used singly, or in a combination of two or more.

When the active energy beam is an ultraviolet ray, a photopolymerization initiator is preferably added. Although the photopolymerization initiator may be a radical polymerization initiator, a cationic polymerization initiator, or a mixed initiator of cationic and radical polymerization initiators, the initiator is preferably a radical polymerization initiator due to its fast reaction rate and excellent productivity. Examples of UV radical polymerization initiators include alkylphenones, benzoins, benzophenones, phosphine oxides, ketals, anthraquinones, thioxarithones, azo compounds, perozides, 2,3-dialkyldione compounds, disulfide compounds, fluoroamine compounds, aromatic sulforniums, titanocenes, and phenyl oxyacetates. These initiators may be used singly, or in a combination of two or more. More specific examples include carbonyl compounds, such as acetophenone, 2,2-diethoxyacetopherone, p-dimethylacetophenone, p-dimethylaminopropiophenone, benzophenone, 2-chlorobenzophenorie, 4,4'-dichlorobenzophenone, 4,4'-bisdiethylaminobenzophenone, Michler's ketone, benzyl, benzoin, benzoin methyl ether, benzoin ethyl ether, benzoin isopropyl ether, methylbenzoylfomate, p-isopropyl-α-hydroxyisobutylphenone, α-hydroxyisobutylphenone, 2,2-dimethoxy-2-phenylacetophenone, and 1-hydroxycyclohexylphenyl ketone; sulfur compounds, such as tetramthylthiuram monosulfide, tetramethylthiuram disulfide, thioxanthone, 2-chlorothioxanthone, and 2-methylthioxanthone; and peroxide compounds, such as benzoyl peroxide, and di-t-butyl peroxide. The lower limit of the amount of the photopolymerization initiator added is 0.1 parts by mass or more, and ore preferably 1 part by mass or more; and the upper limit of the amount of the photopolymerization initiator added is 30 parts by mass or less, and more preferably 20 parts by mass or less, per 100 parts by mass of a resin that is cured by active energy beams. A photopolymerization initiator added in an amount of 0.1 parts by mass or more is preferable because it leads to high hardness of the hard coating layer. A photopolymerization initiator added in an amount of 30 parts by mass or less is preferable because it reduces the likelihood of the hard coating layer becoming yellow, and leads to sufficient curing of the hard coating layer.

Additionally, the hard coating layer may contain various additives to the extent that the additives do not interfere with hard coating performance. Examples of additives include a polymerization inhibitor, a crosslinking agent, an antistatic agent, an adhesion enhancer, an antioxidant, a leveling agent, a coupling agent, a defoaming agent, filler, a solvent, an anti-glare agent, an anti-reflective agent, inorganic filler, and organic filler.

A Method for Producing a Hard Coating Film

To form a hard coating layer, a coating solution prepared by dissolving or dispersing a compound described above in a predetermined amount of a solvent is applied to a polyester film. Examples of organic solvents include aromatic hydrocarbons, such as benzene, toluene and xylene; aliphatic hydrocarbons, such as hexane, heptane, octane, nonane, and decane; ketones, such as methyl ethyl ketone, diethyl ketone, and diisopropyl ketone; and alcohols, such as methyl alcohol, ethyl alcohol, n-propyl alcohol, isopropyl alcohol, n-butyl alcohol, tridecyl alcohol, cyclohexyl alcohol, and 2-methylcyclohecyl alcohol. The organic solvent for use is preferably a solvent with a boiling point of 60 to 180° C. The use of an organic solvent with a boiling point of 60° C. or more can reduce changes in the solids concentration of the coating solution during application of the coating solution, and stabilize the coating film thickness. The use of an organic solvent with a boiling point of 180° C. or less can suppress deterioration of the flatness of a plastic base film caused by heat wrinkles that occur during drying.

The coating method for use can be, for example, wire bar, gravure coating, die coater, knife coater, blade coater, roll coater, or curtain coater; and these methods can be used without any restriction. The method for applying a coating solution to the polyester film and drying the coating film includes known hot-air drying, and infrared heater; and hot-air drying is preferable due to its high drying speed. This rapid drying is preferable because it enables a hard coating layer to form with volatile components dispersed substantially uniformly in the hard coating layer, greatly reducing a curling.

The method for curing the hard coating layer for use includes curing methods using active energy beams, such as ultraviolet rays or electron beams; or curing methods using heat. However, from the standpoint of reducing damage to the film, a curing method using ultraviolet rays or electron beams is preferable. Typically, irradiation with ultraviolet rays is performed from the coating layer side; however, to increase adhesion of the coating layer with the polyester film, irradiation with ultraviolet rays may be performed from the polyester film side. Ultraviolet rays are emitted from, for example, a high-pressure mercury lamp, fusion H lamp, or xenon lamp, which emit ultraviolet rays that have a spectral distribution within the wavelength range of 300 to 400 nm. The lower limit of the irradiation dose is 50 mJ/m$^2$ or more, and more preferably 100 mJ/m$^2$ or more; while the upper limit of the irradiation dose is 1000 mJ/m$^2$ or less, and more preferably 800 mJ/m$^2$ or less. An irradiation dose of 50 mJ/m$^2$ or more is preferable because it leads to high hardness of the hard coating layer. An irradiation dose of 1000 mJ/m$^2$ or less makes it unlikely for the running speed to be overly slow, and is thus advantageous in terms of productivity.

The film thickness of the cured hard coating layer is preferably 1 to 50 μm. A film thickness of 1 w or more ensures sufficient curing, and leads to excellent pencil hardness. A film thickness of 50 μm or less suppresses curling caused by hardening and contraction of the hard coating, thus increasing film handleability. The film thickness of the cured hard coating layer is more preferably 3 to 45 μm, and still more preferably 5 to 40 μm.

Pencil Hardness

The pencil hardness of the hard coating layer is preferably B or higher, more preferably H or higher, and particularly preferably 2H or higher. A pencil hardness of B or higher prevents the hard coating layer from being easily scratched, while not decreasing visibility. Although a higher pencil hardness of the hard coating layer is generally better, the pencil hardness may be 10H or less or 8H or less; even a hard coating layer with a pencil hardness of 5H or less is usable in practice without problems.

Cutting Film

Examples of methods for cutting a long polyester film or hard coating film into a desired sheet form include a mechanical cutting method using a knife, and a laser cutting method using a laser beam. Of these, the cutting method using a laser beam is preferable because this method is less likely to produce cutting dust. When the polyester film is irradiated with a laser beam, the area irradiated with the laser beam of each layer of the film is heated by the energy of the laser beam, and heat-melted or ablated. Thus, the film is cut off in the area irradiated with the laser beam.

The laser oscillator for use includes a $CO_2$ laser, an excimer laser (ArF, KrF, XeCl, XeF), a AG laser, a $YVO_4$ laser, a YLF laser, and a fiber laser. The laser oscillator may be a continuous wave laser oscillator, or a pulsed laser oscillator. Of these, a $CO_2$ laser oscillator is preferable; this is because a $CO_2$ laser oscillator is highly energy efficient and enables processing by applying heat to the material due to its high wavelength, and is thus suitable for processing transparent materials such as polyester films.

The point of irradiation can be sprayed with an assist gas concurrently, while being irradiated with a laser. Blowing an assist gas can prevent a molten material and other materials that formed during the cutting process from adhering to the polyester film or hard coating film. Blowing an assist gas can also prevent the polyester fila or hard coating film from being damaged by heat. Such an assist gas may be a gas inert with a laser beam, such as dry air, nitrogen, or argon.

The output of the laser beam is preferably 1 W or more and less than 30 W, and more preferably 3 W or more and 25 W or less. An output power of less than 1 W may slow the cutting rate and thus decrease the productivity; or may prevent the film from being cut apart. An output of more than 30 W is not preferable; this is because such an output may increase the width of the cut plane, or increase the amount of molten polyester resin due to excessive heat, allowing the resin melted by heat to accumulate on the cut plane and causing the end portion to rise, thereby locally increasing the thickness of the cut plane. This is also not preferable because the film ay be thermally damaged in the area other than the cut plane, or many decomposed products may form. A high-power laser can be handled by lowering the output. A pulse laser can be adjusted to have a decreased average output by controlling the pulse width (ns) or pulse frequency (Hz). The cutting rate is preferably 3 m/min or more, and more preferably 5 m/min or more; the cutting rate is preferably 10 m/min or more from the standpoint of productivity. To increase the cutting rate while reducing thermal damage, the film may be repeatedly irradiated with a laser with the laser output decreased.

Figure 3:
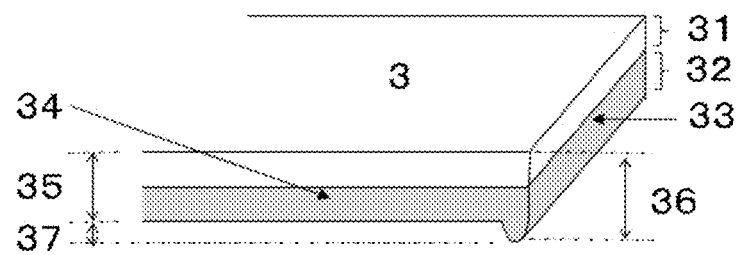
FIG. 3 is a schematic diagram illustrating the amount of rise of the cut plane of the cut end portion in the present invention.

A polyester film or hard coating film cut by a laser beam typically has a portion affected by the laser treatment around the cut plane. The phrase "the portion affected by the laser treatment" refers to the portion of film-constituting resin deformed by heat generated during the cutting process with a laser beam, and includes both cases in which the thickness of the cut plane has increased and decreased. The hard coating film is prone to deformation of the polyester resin that constitutes the polyester film, which is a substrate. In some cases, the resin melted by heat accumulates on the cut plane; and raises the end portion, causing the thickness of the cut plane to increase. The amount of rise in the cut end portion is preferably 35 μm or less, more preferably 20 μm or less, and still more preferably 15 μm or less in at least one side (if the film is cut in a circular or oval shape, the one side is the circumference) of a predetermined cut-out shape (typically, square or rectangular). Reducing the amount of rise in the cut end portion to 35 μm or less not only decreases the change in dimension and creases, but also prevents deformation stress from concentrating on the risen portion on the end portion when the film is repeatedly folded in use; this therefore prevents the film from undergoing worsened bending deformation, crack formation, or rupture. Reducing the amount of rise in the cut end portion to 35 μm or less is also preferable because a display device that uses a hard coating film with a smaller amount of rise in the cut end portion as a surface protection film has no image distortion at the folding portion of the display due to the unlikeliness of occurrence of deformation after the device is repeatedly folded. Although the amount of rise in the cut end portion is ideally 0 μm, the lower limit in practice may be 1 μm or more, or 2 μm or more. The amount of rise in the cut end portion refers to, in the cut end portion (reference numeral 33) of a hard coating film (reference numeral 3) illustrated in FIG. 3, the thickness (reference numeral 37) determined by deducting the thickness (reference numeral 35) of the hard coating film that is not affected by deformation caused by a laser beam from the greatest thickness of the hard coating film (reference numeral 36).

Figure 4:
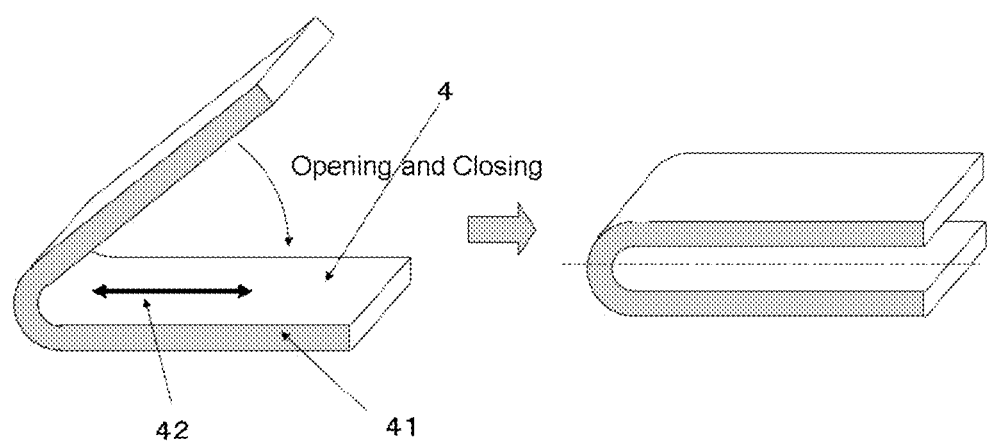
FIG. 4 is a schematic diagram illustrating an end portion of the polyester film according the present invention cut in the bending direction.

FIG. 4 is a schematic diagram illustrating a folded hard coating film (reference numeral 4). The hard coating layer may be located on the inner side of the folded film or on the outer side, or both. In a sheet-shaped film cut out into a desired shape with a laser beam, the side on which the amount of rise of the cut plane is 35 μm or less preferably corresponds to the end portion cut in the bending direction in which the film is folded (reference numeral 41 in FIG. 4). Although not illustrated in reference numeral 41, in most cases, the end portion cut in the bending direction in which the film is folded typically has a risen portion of the cut plane. Additionally, although reference numeral 41 indicates one end portion, the end portion 41 and the end portion on the opposite side (not shown) both particularly preferably have an amount of rise of 35 μm or less on the cut planes. The bending direction refers to the direction orthogonal to the folding portion of the hard coating film when the film is folded (FIG. 4: reference numeral 42).

When a polyester film or hard coating film is cut, the film is typically held on a support plane of a support member, and irradiated with a laser beam. The support member for use may be a rigid material, such as a plate-shaped support substrate; or a material having flexibility, such as a film-shaped support film.

When a polyester film or hard coating film is cut with a laser beam, the film is typically irradiated with a laser beam such that the laser beam scans along a predetermined line on the surface of the film. The predetermined line can be an actually drawn line; however, a virtual line that is not drawn in actuality is typically set. The point hit by a laser beam on the film travels along the predetermined line on the surface of the film, causing the film to be cut into a desired shape. In this process, to enable the laser beam to scan on the surface of the film, the laser irradiation equipment or the film may be moved; or the laser beam and the film may be both moved. The traveling rate at which the point hit by the laser beam travels on the surface of the film can be freely determined depending on the conditions, such as laser beam output or film thickness.

The surface of the polyester film or hard coating film irradiated with a laser beam may be the polyester film substrate or the hard coating surface. Optionally, a cover film may be laminated on the surface to be irradiated with a laser beam and/or the surface opposite the surface to be irradiated with a laser beam; and the polyester film or hard coating film can be integrated with the cover film, and cut with a laser beam. The cover film is removed after the film is cut by the laser beam. Irradiating the film that has a cover film laminated thereon with a laser beam prevents melted matter formed during the cutting process from directly adhering to the polyester film or hard coating film. This can also prevent the polyester film or hard coating film from being damaged by heat. The cover film is suitable for use because the cover film can reduce the formation of a risen portion of resin melted by heat on the cut plane when appropriately used in combination with cutting conditions such as laser intensity.

There is no particular limitation to a base material of the cover film. Examples include resin films of polyethylene terephthalate (PET), polybutylene terephthalate (PBT), polyethylene naphthalate (PEN) polycarbonate (PC), polypropylene (PP), polybutadiene, polymethylpentene, polyurethane, polyvinyl chloride (PVC), polystyrene (PS), fluororesin, polylactic acid, or cellulose. The thicknesses of the cover film may be 1 to 50 μm. An adhesive layer can also be provided on one surface of the cover film. Examples of materials for use in the adhesive layer include acrylic adhesives, polyester adhesives, urethane adhesives, rubber adhesives, silicone adhesives, and vinyl adhesives; the material of the adhesive layer may also be an active energy ray-curable adhesive.

EXAMPLES

Below, the effects of the present invention will be described with reference to Examples and Comparative Examples. First, the evaluation method for the characteristic values used in the present invention is explained.

(1) The Amount of Rise of the Cut End Portion

The end portion of a cut film was cut with a cutter blade in the vertical direction, and the surface of the cut plane was made homogeneous with a microtome. The cut end plane was observed with an RH-2000 digital microscope (Hirox Co., Ltd.) at 600× magnification, and the thickness of the film and the greatest thickness of the end portion of the film were measured. Then, the difference between them was defined as the amount of rise in the cut end portion. For example, reference numeral 37 of the hard coating film in FIG. 3 indicates the amount of rise of the cut plane of the end portion. The amount of rise was measured at freely selected five points per one side of the end portion of the film, and the average was determined to be the amount of rise in the cut plane of the end portion of the film. When the amount of rise was measured in both end portions of the film cut in the bending direction of the film, the average of the amount of rise of each side is shown in Table 1.

(2) The Thickness of a Film

Three samples (5-cm square) were cut out from freely selected three parts of a film. The thickness was measured at five points per sample (15 points in total) with an electric micrometer (Millitron 1245D, manufactured by Feinpruf), and the average was determined to be the thickness of the film.

(3) The Thickness of a Hard Coating Layer

Sections were cut out from freely selected three parts of a hard coating film. The surface of the end plane of one side per section was made homogeneous with a microtome. The end plane was observed with an PH-2000 digital microscope (Hirox Co., Ltd.) at 600× magnification. The thickness of the hard coating layer was measured at five points per end plane (15 points in total), and the average was determined to be the thickness of the hard coating layer.

(4) Intrinsic Viscosity

A film or polyester resin was pulverized and dried, and then dissolved in a mixture solvent of phenol and tetrachloroethane (phenol/tetrachloroethane=60/40 in mass ratio). After this solution was centrifuged to remove inorganic particles, the flow time of the solution with a concentration of 0.4 (g/dl) at 30° C. and the flow time of the solvent alone were measured with an Ubbelohde viscometer. From the ratio of flow time between them, the intrinsic viscosity was calculated using the Huggins equation, based on the assumption that the constant of the Huggins equation was 0.38. In the case of a laminated film, the intrinsic viscosity of each individual layer was evaluated by scraping off the polyester layer of the film, depending on the thickness of the laminate.

(5) Flex Resistance

A polyester film was cut to a size of 200 μm (bending direction)×50 mm (the direction of the folding portion) to prepare a sample for measurement. Two glass plates (thickness: 5 mm) were placed with spacers (various thicknesses) between them at the ends of the plates to form a space. The film was sandwiched in the space, and held for 10 seconds. Immediately afterward, fluorescent light was reflected on the film, and the folding portion was observed. The distance in which no folded mark was made was recorded.

A: The distance in which no folded mark was made was less than 6.5 mm.

B: The distance in which no folded mark was made was 6.5 mm or more and less than 7.0 ma.

C: The distance in which no folded mark was made was 7.0 mm or more.

(6) Repeated Flex Resistance

A sample (width direction (the direction of the folding portion): 50 mm× flow direction (bending direction): 100 mm) was prepared. The sample was bent 50,000 times at a rate of 1 time/second using a tension-free folding clamshell-type jig DLDMLH-FS, produced by Yuasa System. Co., Ltd.), with the bend radius set to 3 mm. In this process, the sample was fixed at the point of 10 mm from both end portions of the long side, and the portion to be bent was 50 mmm×80 mm. After completion of the bending treatment, the sample was placed on a flat surface with the inner side of the folded sample down, and visually inspected.

A: No deformation was observed; or if deformation was observed, the sample, when horizontally placed, rose at a maximum height of less than 3 mm.

B: Deformation was observed. When placed horizontally, the sample rose at a maximum height of 3 mm or more and less than 5 mm.

C: A folded mark was observed in the sample; or when placed horizontally, the sample rose at a maximum height of 5 mm or more.

(7) Pencil Hardness

A prepared polyester film with a hard coating thereon was measured at a rate of 0.5 mm/s under a load of 750 g in accordance with JIS K 5600-5-4:1999.

Preparation of Polyethylene Terephthalate Pellet A

A continuous esterification reactor composed of a three-stage complete mixing vessel equipped with a stirrer, a condenser, a raw material feeder, and a product extracting port was used as an esterification reactor. A slurry of TPA (2 tons/hr), EG (2 mol per mol of TPA), and antimony trioxide (160 ppm of Sb atoms based on produced PET) was continuously supplied to the first esterification reaction unit of the esterification reactor; and was allowed to react at 255° C. for an average residence time of 4 hours under ambient pressure. Subsequently, the reaction product in the first esterification reaction unit was taken outside of the system, and supplied to the second esterification reaction unit. EG evaporated from the first esterification reaction unit (8 mass: of the produced polymer (produced PET)) was supplied to the second esterification reaction unit. Additionally, an EG solution containing magnesium acetate such that the amount of Mg atoms was 65 ppm based on the produced PET and an EG solution containing TMPA such that the amount of P atoms was 20 ppm based on the produced PET were added thereto, and the mixture was reacted at 260° C. for an average residence time of 1.5 hours under ambient pressure. Subsequently, the reaction product in the second esterification reaction unit was continuously taken outside of the system and supplied to the third esterification reaction unit. An EG solution containing TMPA such that the amount of P atoms was 20 ppm based on the produced PET was further added thereto, followed by reaction at 260° C. for an average residence time of 0.5 hours under ambient pressure. The esterification reaction product generated in the third esterification reaction unit was continuously supplied to a three-stage continuous polycondensation reactor to perform polycondensation; followed by filtration through a sintered stainless steel filtration material (nominal filtration accuracy: 5-μm particles are 90% cut), thereby obtaining polyethylene terephthalate pellet A with an intrinsic viscosity of 0.62 dl/g.

Preparation of Polyethylene Terephthalate Pellet B

Polyethylene terephthalate pellet A was subjected to solid-phase polymerization at 220° C. under reduced pressure of 0.5 mmHg with a rotary vacuum polymerization apparatus while changing the reaction time, thereby preparing polyethylene terephthalate pellet B with an intrinsic viscosity of 0.72 dL/g.

Preparation of Polyethylene-2,6-Naphthalate Pellet C 100 parts of diethyl 2,6-naphthalenedicarboxylte and 60 parts of ethylene glycol with 0.03 parts of manganese acetate tetrahydrate as a transesterification catalyst were subjected to transesterification in accordance with an ordinary method. Then, 0.042 parts of triethyl phosphonoacetate was added thereto to substantially end the transesterification. Subsequently, 0.024 parts of antimony trioxide was added; and polymerization was continuously performed at high temperatures under high vacuum in accordance with an ordinary method, thereby obtaining polyethylene-2,6-naphthalate pellet C with an intrinsic viscosity of 0.60 dl/g.

Preparation of Copolymerized Polyester Resin Aqueous Dispersion

A reactor was charged with 95 parts by mass of dimethyl terephthalate, 95 parts by mass of dimethyl isophthalate, 35 parts by mass of ethylene glycol, 145 parts by mass of neopentyl glycol, 0.1 parts by mass of zinc acetate, and 0.1 parts by mass of antimony trioxide; and transesterification was performed at 180° C. for 3 hours. Subsequently, 6.0 parts by mass of 5-sodium sulfoisophthalic acid was added, and esterification was performed at 240° C. for 1 hour; followed by polycondensation at 250° C. under reduced pressure (10 to 0.2 mmHg) for 2 hours, thereby obtaining a copolymerized polyester resin with a number average molecular weight of 19,500 and a softening point of 60° C.

300 parts by mass of the obtained copolymerized polyester resin and 140 parts by mass of butyl cellosolve were stirred at 160° C. for 3 hours to obtain a vicious melt, and 560 parts by mass of water was gradually added to this melt. After 1 hour, a uniform, light-white copolymerized polyester resin aqueous dispersion with a solids concentration of 30% was obtained.

Preparation of Polyurethane Resin Aqueous Solution 100 parts by mass of polyester diol (OHV: 2000 eq/ton) formed of adipic acid, 1,6-hexanediol, and neopentyl glycol (molar ratio: 4/2/3) and 41.4 parts by mass of xylylene diisocyanate were mixed; and then reacted at 80 to 90° C. for 1 hour in a nitrogen stream, followed by cooling to 60° C. 70 parts by mass of tetrahydrofuran was added and dissolved, thereby obtaining a urethane prepolymer solution (NCO/OH ratio: 2.2; free isocyanate group: 3.30 mass %). Subsequently, the urethane prepolymer solution was adjusted to 40° C.; and 45.5 parts by mass of a 20 mass % sodium bisulfite aqueous solution was added, followed by reaction at 40 to 50° C. for 30 minutes with intense stirring. After the free isocyanate group content (on a solids basis) was confirmed to have disappeared, the reaction product was diluted with emulsified water, thereby obtaining a self-crosslinked polyurethane resin aqueous solution containing isocyanate groups blocked by sodium bisulfite with a solids content of 20 mass %.

Preparation of Easy-to-Adhere-Layer-Forming Coating Solution 7.5 parts by mass of the 30 mass % copolymerized polyester resin aqueous dispersion, 11.3 parts by mass of the polyurethane resin aqueous solution, 0.3 parts by mass of organo-tin catalyst, 39.8 parts by mass of water, and 37.4 parts by mass of isopropyl alcohol were mixed. Additionally, a 10 mass % aqueous solution of a fluorine-based surfactant (polyoxyethylene-2-perfluorohexyl ethyl ether) (0.6 parts by mass), a 20 mass % aqueous dispersion of colloidal silica (average diameter: 40 nm) (2.3 parts by mass), and a 3.5 mass % aqueous dispersion of dry silica (average diameter: 200 nm, average primary particle diameter: 40 nm) (0.5 parts by mas) were added thereto. Subsequently, the mixture was adjusted to a pH of 6.2 with a 5 mass % sodium bicarbonate aqueous solution; and precisely filtered through a felt-type polypropylene filter with a filtration particle size of 10 μm (initial filtration efficiency: 95%), thereby preparing an easy-to-adhere-layer-forming coating solution.

Hard-Coating-Layer-Forming Coating Solution 1

0.1 parts by mass of a leveling agent (BYK307, produced by BYK Japan KK, concentration 100%) was added to 100 parts by mass of a hard coating material (Opstar (registered trademark) Z7503, produced by JSR Corporation, concentration 75%); and the mixture was diluted with methyl ethyl ketone, thereby preparing hard-coating-layer-forming coating solution 1 with a solids content concentration of 40 mass %.

Hard-Coating-Layer-Forming Coating Solution 2

95 parts by mass of a urethane acrylate hard coating agent (Beamset (registered trademark) 577, produced by Arakawa Chemical Industries Ltd., solids content concentration 100%), 5 parts by mass of a photopolymerization initiator (Irgacure (registered) Trademarks) 164, produced by BASF Japan Ltd., solids content concentration 100%), and 0.1 parts by mass of a leveling agent (BY307, produced by BYK Japan K, solids concentration 100%) were mixed; and the mixture was diluted with a solvent (toluene/MEK=1/1), thereby preparing a hard-coating-layer-forming coating solution 2 with a solids content concentration of 40 mass %.

Example 1

Polyethylene terephthalate pellet A was dried at 150° C. for 8 hours under reduced pressure (3 Torr); and supplied to an extruder, followed by melting at 265° C. This polymer was filtered through a sintered stainless steel filter material (nominal filtration accuracy: 10-μm particles are 95% cut), and extruded from the outlet into a sheet form. The sheet-form polymer was then brought into contact with a casting drum (surface temperature 30° C.) by using an electrostatic application casting method to solidify the polymer by cooling, thereby preparing an unstretched film. The unstretched film was uniformly heated to 75° C. using heating rolls; and then heated to 100° C. using a non-contact heater, followed by roll drawing (drawing in the longitudinal direction) to a 3.0-fold film (the longitudinal direction of the film corresponds to the bending direction). Subsequently, the easy-to-adhere-layer-forming coating solution was applied to the uniaxially stretched film on the surface on which the casting drum came into contact by using reverse kiss coating such that the thickness of the resin solids after drying was 0.3 μm. While being dried, the uniaxially stretched film having a coating layer was guided to a tenter, heated to 140° C., and laterally stretched 4.0-fold. With the width fixed, the film was subjected to heat treatment at 240° C. for 5 seconds; and relaxed by 4% in the width direction at 210° C., thereby obtaining a polyester film with a thickness of 50 μm the width direction of the film corresponds to the direction of the folding portion). Hard-coating-layer-forming coating solution 1 was applied to the easy-to-adhere layer formed on the obtained polyester film using a Meyer bar such that the thickness of the film after drying was 5.0 μm. The coating was dried at 80° C. for 1 minute; and irradiated with TV light (a high-pressure mercury lamp, integrated light intensity 200 mJ/cm$^2$), thereby obtaining a hard coating film. The obtained polyester film and hard coating film were individually cut to a predetermined size by using a laser processor (laser beam source: carbon dioxide gas laser, laser wavelength: 10.6 μm) at an output of 9 W and a processing rate of 64 mm/s such that the longitudinal direction of the film corresponds to the bending direction, thereby obtaining a polyester film in sheet form and a hard coating film in sheet form. The hard coating film was irradiated with a laser beam on the surface on which a hard coating layer was formed. In the measurement of flex resistance and repeated flex resistance, sample films for measurement were cut to a predetermined size under the same laser processing conditions such that the longitudinal direction of the film corresponds to the bending direction; and measurement was performed.

Example 2

The procedure of Example 1 was repeated using a polyester film and a hard coating film obtained in the same manner as in Example 1, except that the laser output was changed to 18 W, thereby obtaining a polyester film in sheet form and a hard coating film in sheet form. In the measurement of flex resistance and repeated flex resistance, sample films for measurement were cut to a predetermined size under the same laser processing conditions; and measurement was performed.

Examples 3 to 5

The procedure of Example 1 was repeated, except that the draw ratio and thickness were changed as shown in Table 1, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Example 6

The procedure of Example 1 was repeated using the polyester film obtained in the same manner as in Example 1, except that hard-coating-layer-forming coating solution 1 was applied such that the thickness of the film after drying was 10.0 μm, thereby obtaining a hard coating film. Laser processing was then performed in the same manner as in Example 1, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Example 7

The procedure of Example 1 was repeated using the polyester film obtained in the same manner as in Example 1, except that hard-coating-layer-forming coating solution 2 was applied, thereby obtaining a hard coating film. Laser processing was then performed in the same manner as in Example 1, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Example 8

The procedure of Example 1 was repeated using the polyester film and hard coating film obtained in the same manner as in Example 1, except that a cover film (a 25-μm thick polyester adhesive tape) was adhered to the surface not to be irradiated with a laser beam when being cut with a laser processing machine; and that the cover film was peeled off after the film was cut, thereby obtaining a polyester film in sheet form and a hard coating film in sheet form. Adhering a protection film on the hard coating film was performed not on the hard coating layer, but on the surface of the polyester film (substrate). In the measurement of flex resistance and repeated flex resistance, sample films for measurement were cut to a predetermined size in the same manner as above; and measurement was performed.

Example 9

The procedure of Example 1 was repeated, except that polyethylene-2,6-naphthalate pellet C was used; and that the heat treatment temperature for forming a film was changed as shown in Table 1, thereby obtaining a polyester film. Laser processing was then performed in the same manner as in Example 1, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Example 10

The procedure of Example 1 was repeated, except that the draw ratio in the longitudinal was changed as shown in Table 1, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Example 11

The procedure of Example 10 was repeated, except that the draw ratio in the width direction was changed to 5.0-fold, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Examples 12 to 14

The procedure of Example 1 was repeated, except that the draw ratio in the longitudinal direction was changed as shown in Table 1, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Example 15

The procedure of Example 1 was repeated using a polyester film and a hard coating film obtained in the same manner as in Example 1, except that laser irradiation was performed at a laser output of 5 W at a processing rate of 320 mm/s three times, thereby obtaining a polyester film in sheet form and a hard coating film in sheet form. In the measurement of flex resistance and repeated flex resistance, sample films for measurement were cut to a predetermined size in the same manner as above; and measurement was performed.

Comparative Example 1

The procedure of Example 1 was repeated using a polyester film and a hard coating film obtained in the same manner as in Example 1, except that the laser output was changed to 30 W, thereby obtaining a polyester film in sheet form and a hard coating film in sheet form. In the measurement of flex resistance and repeated flex resistance, sample films for measurement were cut to a predetermined size under the same laser processing conditions as those above; and measurement was performed.

Comparative Example 2

The procedure of Example 1 was repeated, except that polyethylene terephthalate pellet B shown in Table 1 was used, and that the laser output was changed to 18 W, thereby obtaining a polyester film in sheet form and a hard coating film in sheet form. In the measurement of flex resistance and repeated flex resistance, sample films for measurement were cut to a predetermined size under the same laser processing conditions as those in Example 1; and measurement was performed.

Comparative Example 3

The procedure of Example 1 was repeated, except that the thickness was changed as shown in Table 1, thereby obtaining a polyester film in sheet form and a hard coating film in sheet form. In the measurement of flex resistance and repeated flex resistance, sample films for measurement were cut to a predetermined size under the same processing conditions as those in Example 1; and measurement was performed.

Comparative Example 4

The procedure of Example 1 was repeated using a polyester film obtained in the same manner as in Example 1, except that hard-coating-layer-forming coating solution 1 was applied such that the film thickness after drying was 10.0 μm, to thereby obtain a hard coating film. Further, the procedure of Example 1 was repeated, except that the laser output was changed to 30 W, thereby obtaining a polyester film in sheet form and a hard coating film in sheet form. In the measurement of flex resistance and repeated flex resistance, sample films for measurement were cut to a predetermined size under the same laser processing conditions as those above; and measurement was performed.

Each of these hard coating films was laminated to an organic EL module via a 25-μm-thick adhesive layer, thereby preparing a smartphone-type foldable display that is foldable in half in the middle; with a radius of 3 mm, which corresponds to the bend radius in FIG. 1. The hard coating film was placed on the surface of a single continuous piece of display through the folding portion, and the hard coating layer was placed so as to be the surface of the display. The displays prepared by using the hard coating films of the Examples were all satisfactory in operation and visibility as a smartphone that can be folded in half in the middle, and carried. However, the foldable displays prepared by using the hard coating films of the Comparative Examples were not particularly preferred, because they appeared to begin having image distortion in the folding portion as they were used frequently.

TABLE 1

| | Polyester Pellet | | Draw Ratio | | Heat | Polyester Film | | End Portion Cut in the Bending Direction 1 | End Portion Cut in the Bending Direction 2 |
| | | | | | | | | Amount of | Amount of |
| | Type | Intrinsic Viscosity (dL/g) | Bending Direction | Direction of Folding Portion | Treatment Temperature (° C.) | Intrinsic Viscosity (dL/g) | Thickness (μm) | Rise in Cut Plane (μm) | Rise in Cut Plane (μm) |
|---|---|---|---|---|---|---|---|---|---|
| Example 1 | A | 0.62 | 3.0 | 4.0 | 240 | 0.58 | 50 | 26.3 | 26.2 |
| Example 2 | A | 0.62 | 3.0 | 4.0 | 240 | 0.58 | 50 | 29.3 | 29.6 |

TABLE 1-continued

| | | | | | | | | | |
|---|---|---|---|---|---|---|---|---|---|
| Example 3 | A | 0.62 | 3.4 | 4.0 | 240 | 0.58 | 50 | 29.5 | 29.4 |
| Example 4 | A | 0.62 | 3.0 | 4.0 | 240 | 0.58 | 25 | 22.5 | 22.7 |
| Example 5 | A | 0.62 | 3.0 | 4.0 | 240 | 0.58 | 75 | 29.6 | 29.8 |
| Example 6 | A | 0.62 | 3.0 | 4.0 | 240 | 0.58 | 50 | 26.5 | 26.2 |
| Example 7 | A | 0.62 | 3.0 | 4.0 | 240 | 0.58 | 50 | 26.1 | 26.2 |
| Example 8 | A | 0.62 | 3.0 | 4.0 | 240 | 0.58 | 50 | 14.2 | 14.4 |
| Example 9 | C | 0.60 | 3.0 | 4.0 | 210 | 0.57 | 50 | 32.9 | 32.6 |
| Example 10 | A | 0.62 | 1.0 | 4.0 | 240 | 0.58 | 50 | 27.3 | 26.9 |
| Example 11 | A | 0.62 | 1.0 | 5.0 | 240 | 0.58 | 50 | 23.5 | 23.7 |
| Example 12 | A | 0.62 | 1.4 | 4.0 | 240 | 0.58 | 50 | 28.8 | 28.9 |
| Example 13 | A | 0.62 | 1.7 | 4.0 | 240 | 0.58 | 50 | 27.6 | 27.7 |
| Example 14 | A | 0.62 | 2.0 | 4.0 | 240 | 0.58 | 50 | 25.5 | 25.8 |
| Example 15 | A | 0.62 | 3.0 | 4.0 | 240 | 0.58 | 50 | 11.4 | 11.2 |
| Comparative Example 1 | A | 0.62 | 3.0 | 4.0 | 240 | 0.58 | 50 | 36.7 | 36.9 |
| Comparative Example 2 | B | 0.72 | 3.0 | 4.0 | 240 | 0.68 | 50 | 37.4 | 37.2 |
| Comparative Example 3 | A | 0.62 | 3.0 | 4.0 | 240 | 0.58 | 100 | 34.3 | 34.2 |
| Comparative Example 4 | A | 0.62 | 3.0 | 4.0 | 240 | 0.58 | 50 | 36.5 | 36.5 |

| | Polyester Film | | | Hard Coating Film | | | | |
|---|---|---|---|---|---|---|---|---|
| | Flex Resistance | | Repeated Flex Resistance | Coating Solution | Film Thickness (μm) | Pencil Hardness | End Portion Cut in the Bending Direction 1 Amount of Rise in Cut Plane (μm) | End Portion Cut in the Bending Direction 2 Amount of Rise in Cut Plane (μm) | Repeated Flex Resistance |
| | Distance (mm) | Result | | | | | | | |
| Example 1 | 6.0 | A | A | 1 | 5.0 | 2H | 24.4 | 24.2 | A |
| Example 2 | 6.0 | A | A | 1 | 5.0 | 2H | 27.7 | 27.6 | A |
| Example 3 | 6.4 | A | A | 1 | 5.0 | 2H | 27.1 | 27.4 | A |
| Example 4 | 4.9 | A | A | 1 | 5.0 | H | 20.9 | 20.7 | A |
| Example 5 | 6.4 | A | A | 1 | 5.0 | 3H | 27.4 | 27.3 | A |
| Example 6 | 6.0 | A | A | 1 | 10.0 | 3H | 22.1 | 22.2 | A |
| Example 7 | 6.0 | A | A | 2 | 5.0 | 2H | 24.5 | 24.2 | A |
| Example 8 | 6.0 | A | A | 1 | 5.0 | 2H | 2.0 | 2.0 | A |
| Example 9 | 6.4 | A | A | 1 | 5.0 | 3H | 30.1 | 30.6 | A |
| Example 10 | 5.0 | A | A | 1 | 5.0 | H | 25.2 | 24.9 | A |
| Example 11 | 5.0 | A | A | 1 | 5.0 | H | 22.2 | 23.3 | A |
| Example 12 | 5.0 | A | A | 1 | 5.0 | H | 26.8 | 26.8 | A |
| Example 13 | 5.1 | A | A | 1 | 5.0 | 2H | 26.0 | 26.5 | A |
| Example 14 | 5.4 | A | A | 1 | 5.0 | 2H | 22.9 | 22.8 | A |
| Example 15 | 6.0 | A | A | 1 | 5.0 | 2H | 6.4 | 7.3 | A |
| Comparative Example 1 | 6.0 | A | B | 1 | 5.0 | 2H | 35.1 | 35.6 | C |
| Comparative Example 2 | 6.7 | B | B | 1 | 5.0 | 2H | 35.8 | 35.9 | C |
| Comparative Example 3 | 7.0 | C | C | 1 | 5.0 | 4H | 33.1 | 32.9 | C |
| Comparative Example 4 | 6.0 | A | B | 1 | 10.0 | 3H | 35.5 | 35.2 | C |

INDUSTRIAL APPLICABILITY

While maintaining mass production applicability, foldable displays that use the polyester film or hard coating film for foldable display surface protection films according to the present invention do not undergo deformation after the polyester film or hard coating film positioned on the surface of the foldable displays are repeatedly folded; and thus do not have image distortion in the folding portion of the displays. Mobile devices equipped with a foldable display that uses the polyester film or hard coating film according to the present invention as a surface protection film provide beautiful images, and are highly functional and highly convenient (e.g., portability).

DESCRIPTION OF REFERENCE NUMERALS

1: foldable display
11: bend radius
2: polyester film for foldable display surface protection films
21: folding portion
22: bending direction (the direction orthogonal to the folding portion)
3: hard coating film for foldable display surface protection films
31: hard coating layer
32: polyester film substrate
33: cut end portion of the hard coating film
34: end plane cut in the direction perpendicular to the cut end portion of the hard coating film
35: thickness of the hard coating film
36: thickness of the thickest portion of the cut end portion of the hard coating film
4: hard coating film for foldable display surface protection films
41: end portion cut in the bending direction (with a risen portion)
42: bending direction (the direction orthogonal to the folding portion)

The invention claimed is:
1. A foldable display having a hard coating film for a foldable display surface protection film, wherein the hard coating film comprises a polyester film for the foldable display surface protection film and a hard coating layer with a thickness of 1 to 50 μm formed on at least one surface of the polyester film, the polyester film is a monolayered film comprising one or more polyester resins or a multilayered film comprising two or more polyester resins, wherein each of the polyester resins is selected from polyethylene terephthalate, polybutylene terephthalate, and copolymers containing these resins as a main component, the polyester film is cut in sheet form, the polyester film has a thickness of 10 to 75 μm, the polyester film has an intrinsic viscosity of 0.55 to 0.62 dl/g, the amount of rise of a cut plane of each of two cut end portions facing each other is 35 μm or less, the cut plane being formed by cutting the polyester film in the bending direction of the polyester film, the bending direction being a direction orthogonal to a folding portion of the polyester film when the polyester film is folded, the hard coating layer has a pencil hardness of H or more as measured under a load of 750 g in accordance with JIS K5600-5-4:1999, the hard coating film is disposed as a surface protection film such that the hard coating layer becomes the surface, and the foldable display has a bend radius of 5 mm or less when the foldable display is folded.

2. The foldable display according to claim 1, wherein the hard coating film is a single continuous film placed through the folding portion of the foldable display.

3. A mobile device comprising the foldable display of claim 1.

4. The foldable display according to claim 1, wherein the two cut end portions of the polyester film are formed by using a laser beam, and an output of the laser beam is 1 W or more and less than 30 W.

5. The foldable display according to claim 1, wherein the polyester film has a total light transmittance of 85% or more, and the polyester film has a haze of 3% or less.

6. The foldable display according to claim 1, wherein the polyester film is a monolayered film comprising one or more polyester resins, and each of the polyester resins is selected from polyethylene terephthalate, polybutylene terephthalate, and copolymers containing these resins as a main component.

7. The foldable display according to claim 1, wherein the polyester film is a multilayered film comprising two or more polyester resins, and each of the polyester resins is selected from polyethylene terephthalate, polybutylene terephthalate, and copolymers containing these resins as a main component.

* * * * *